J. A. KUSY.
NUT LOCK.
APPLICATION FILED MAR. 20, 1917.
1,241,401.
Patented Sept. 25, 1917.
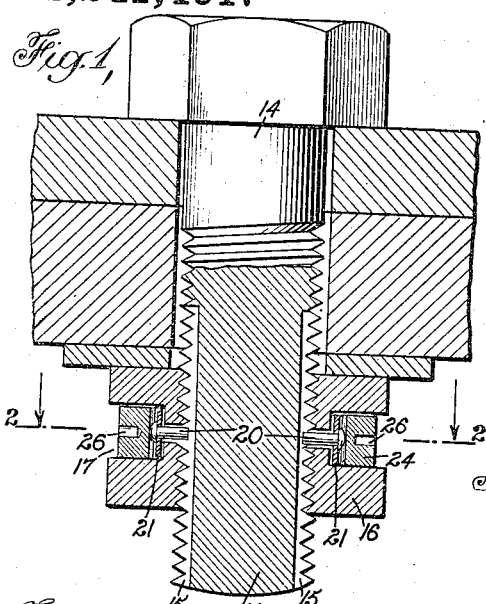
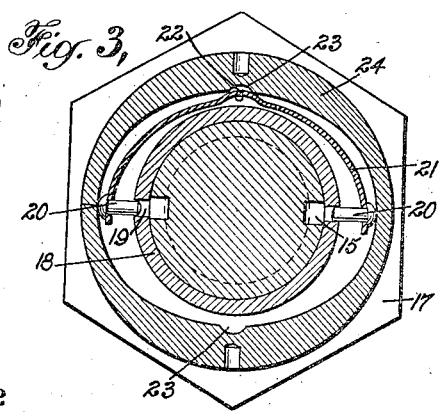
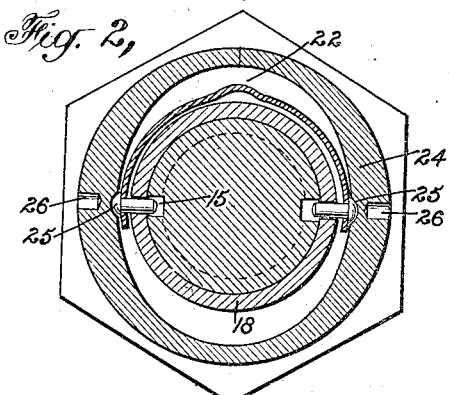
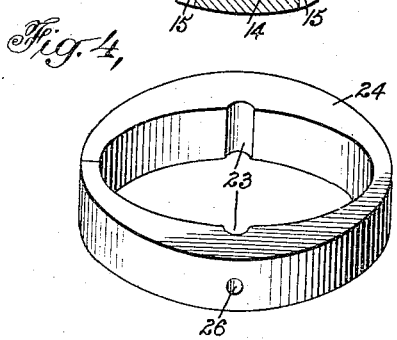
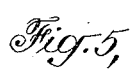
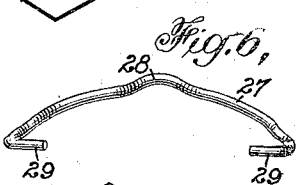
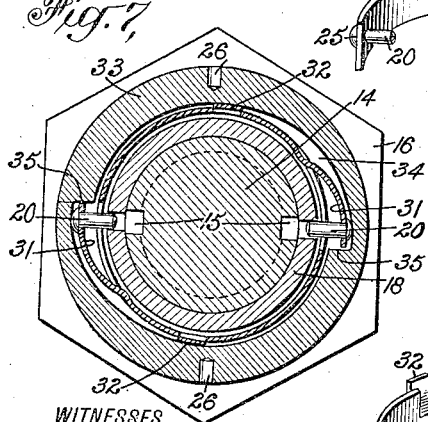
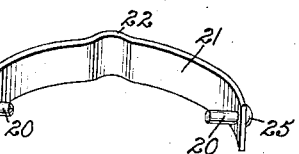
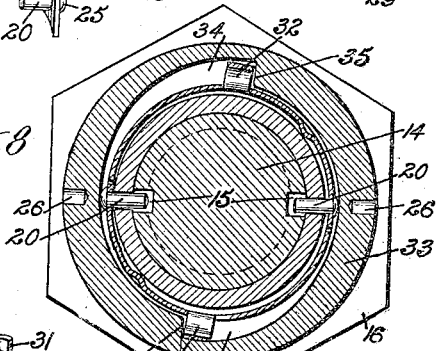
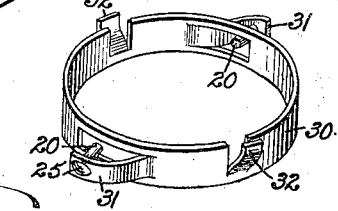
WITNESSES
INVENTOR
J. A. Kusy
BY
ATTORNEYS

UNITED STATES PATENT OFFICE.

JAROSLAV A. KUSÝ, OF NEW YORK, N. Y.

NUT-LOCK.

1,241,401.    Specification of Letters Patent.    Patented Sept. 25, 1917.

Application filed March 20, 1917. Serial No. 156,005.

*To all whom it may concern:*

Be it known that I, JAROSLAV A. KUSÝ, a citizen of the United States, and a resident of the city of New York, borough of Manhattan, in the county and State of New York, have invented a new and Improved Nut-Lock, of which the following is a full, clear, and exact description.

Among the principal objects which the present invention has in view are: to lock the locking member of a nut lock in active position; to release the locking member manually; to provide a simple construction for locking screw-nuts in active service relation; and to facilitate the assemblage of the members constituting the lock.

*Drawings.*

Figure 1 is a vertical section of a bolt, washer, and nut applied to said bolt, showing the parts in active position, said nut having locking devices constructed and arranged in accordance with the present invention;

Fig. 2 is a cross section of the same, the section being taken as on the line 2—2 in Fig. 1;

Fig. 3 is a cross section on the same plane as Fig. 2, the parts being shown in the inactive position;

Fig. 4 is a perspective view of the cover ring with which the invention is provided;

Fig. 5 is a perspective view of the improved form of the locking expansion member and members thereof;

Fig. 6 is a perspective view of a modified form of the same;

Fig. 7 is a modified form of the mechanism showing the same as inactively disposed;

Fig. 8 is a similar view of the same, showing the parts as actively disposed;

Fig. 9 is a perspective view of the locking ring shown in Figs. 7 and 8.

*Description.*

As seen in the drawings, the bolt 14 has two or more grooves 15 disposed lengthwise of the bolt and as best shown in Fig. 1 of the drawings, of the threaded section thereof. A nut such as indicated by the numeral 16 when arranged to coöperate with a bolt having this structural feature, is provided with an annular groove 17. The groove 17 when formed leaves at the center of the cut a cylindrical relatively thin wall 18. The wall 18 is perforated as shown best in Fig. 3 of the drawings to form passages 19 through which key pins 20 are moved into the grooves 15 when the nut is disposed to aline said passages with said grooves. Normally the pins 20 are retracted or held from engagement with said grooves by the bowed expanding spring member 21. The member 21 is provided with a projection 22 centrally disposed. These projections engage recesses 23 in a setting collar 24. The collar 24 circumfolds the member 21 and fills the groove 17 in the nut 16.

The collar 24 is preferably constructed of non-resilient material and is split so that the ends may pass over the wall 18 and the spring member 21. The collar has an oval-shaped open center, and in line with the shorter diameter of said center are the recesses 23.

When the collar 24 is moved to the position shown in Fig. 2 of the drawings, the said recesses aline with the pins 20 and engage the heads 25 thereof. In this position, as seen in said figure, the ends of the member 21 and the pins 20 carried thereby are contracted moving the inner ends of said pins into the grooves 15 in the bolt 14. It will be noted that in this position the engagement of the heads 25 by the recesses 23, retains the collar 24 to prevent its movement while the pins 20 prevent the relative rotation of the bolt 14 and nut 16. The collar 24 may in some instances be rotated by hand, but usually it is preferred to provide holes 26 to facilitate the use of a spanner wrench for rotating said collar.

The modification of the invention shown in Fig. 6 of the drawings consists in employing a spring wire bow 27 in which is formed a hump 28 at the center thereof, and hook ends 29 at the terminals. The ends 29 in service are substitutes for the pins 20 of the preferred form.

The modified form of the invention shown in Figs. 7 to 9 inclusive, employs in place of the member 21, a thin ring. This ring 30 has integrally formed therewith and outwardly pressed therefrom spring tongues 31. The tongues 31 are equipped with and support in rigid connection therewith the pins 20. Mid-distance between the tongues 31, the ring 30 is provided with releasing tongues 32. The collar 33, which in the modified form of the invention is substituted for the collar 24 of the preferred form, is provided with cam-shaped recesses 34. The abutments 35 forming one end of said recesses, operate for engaging the tongues 32 to hold the collar 33 in the active position of the locking device where the pins 20 are forced into the grooves 15.

*Operation.*

When operating nuts and bolts constructed and arranged in accordance with the preferred form of the invention, the bolt having been placed, the collar 24 is preparatorily disposed as shown in Fig. 3 of the drawings, where one of the recesses 23 of said collar engages the projection 22 of the member 21. The long axis of the center of the collar is then disposed in line with the pins 20, and the member 21 is permitted to retract the same from the inner surface of the wall 18. In this position the nut 16 is set up on the bolt 14 in the manner usual with devices of this character.

When the nut is set in position and is forced to a position where the passages 19 aline with the grooves 15, the operator rotates the collar 24 until the recesses 23 aline with the heads 25 of the pins 20. This is the position shown in Fig. 2 of the drawings, wherein it will be observed that the ends of the pins 20 are forced into the grooves 15. The collar 24 is now held by the pins in the said position.

When it is desired to remove the nut 16, the operator rotates the collar 24 to the position shown in Fig. 3 of the drawings, and thereafter manipulates the nut in the same manner as employed in manipulating nuts of usual construction.

When employing locks of the modified form shown in Figs. 7 to 9 inclusive, the collar 33 is preliminarily disposed as shown in Fig. 7, wherein the tongues 31 and pins 20 supported thereby rest in the recesses 34. The pins 20 being withdrawn from the inner surface of the wall 18 and bolt-hole of the nut when the nut is set up to its service position and adjusted with reference to the bolt 14, so that said pins aline with the grooves 15, the collar 33 is rotated clockwise to the position shown in Fig. 8 of the drawings.

In the above-mentioned movement of the collar 33, it is obvious that the inclined wall of the recess 34 has pressed inwardly the tongues 21 and pins 20 supported thereby, the said pins entering the grooves 15 as shown. When the abutments 35 of the recesses 34 pass over the tongues 32, the said tongues spring outwardly into the recesses 34 and effect a lock for the collar 33, which prevents their retraction.

When now it becomes necessary to remove the nut from the bolt, the operator manually engages the free ends of the tongues 32 and presses them out of engagement with the abutments 35 of the recesses 34. In this position of the said tongues 32, it is possible to retractively rotate the collar 33 to dispose the parts in the positions shown in Fig. 7 of the drawings, where it will be seen that the tongues 31 spring outwardly into the recesses 34 and withdraw the pins 20 from engagement with the grooves 15.

*Claims.*

1. The combination of a bolt having a plurality of longitudinally-disposed grooves in the threaded section of said bolt; a nut having a circular groove and passages extending from said groove to the bolt opening of said nut; a plurality of pin-like members mounted in said passages for extension therethrough to engage said grooves in said bolt; resilient supports for said pin-like members for normally holding said pin-like members outwardly extended from engagement with said grooves; a collar surrounding said resilient supports for compressing the same to move said pin-like members toward the center of said nut when said collar is rotated; and means for locking said collar in position to hold said resilient supports under compression.

2. The combination of a bolt having a plurality of longitudinally-disposed grooves in the threaded section of said bolt; a nut having a circular groove and passages extending from said groove to the bolt opening of said nut, a plurality of pin-like members mounted in said passages for extension therethrough to engage said grooves in said bolt; spring supports for said pin-like members for normally holding said pin-like members outwardly extended from engagement with said grooves; a collar surrounding said spring supports for compressing the same to move said pin-like members toward the center of said nut when said collar is rotated; means for locking said collar in position to hold said spring supports under compression; and means for manually releasing said collar for movement of said collar out of the position where said collar controls said spring supports.

JAROSLAV A. KUSÝ.